United States Patent [19]

Jarret et al.

[11] 4,004,794
[45] Jan. 25, 1977

[54] SPRING FORMED OF AN ELASTOMER MASS INCLUDING WATER

[75] Inventors: Jean Jarret, Fourqueux; Jacques Jarret, Vhatou, both of France

[73] Assignee: Societe d'Exploitation des Ressorts Auto-Amortisseurs Jarret, Paris, France

[22] Filed: Apr. 5, 1973

[21] Appl. No.: 348,162

[30] Foreign Application Priority Data

Apr. 19, 1972 France .............................. 72.13817

[52] U.S. Cl. .............................. 267/153; 188/268; 188/276
[51] Int. Cl.² ........................ F16F 9/52; F16F 1/36
[58] Field of Search ............ 267/153, 35, 139, 140, 267/141, 3; 188/268, 276

[56] References Cited

UNITED STATES PATENTS

| | | | |
|---|---|---|---|
| 2,457,749 | 12/1948 | Thiry | 267/35 |
| 2,994,524 | 8/1961 | Jarret et al. | 267/153 |
| 3,514,144 | 5/1970 | Alderfer | 267/140 |
| 3,574,379 | 4/1971 | Jordan | 267/140 |
| 3,658,314 | 4/1972 | Luzsicza | 267/3 |

OTHER PUBLICATIONS

"Elastomers and Plastomers," vol. 1, R. Houwink, Elsevier Publishing Co., Inc., 1950, pp. 323–326.

*Primary Examiner*—Evon C. Blunk
*Assistant Examiner*—Jeffrey V. Nase
*Attorney, Agent, or Firm*—Marn & Jangarathis

[57] ABSTRACT

There is disclosed an improved spring of the type in which an elastomer is subjected to hydrostatic compression and is constituted by a mass of elastomer contained in an enclosure which comprises a casing in which a piston is mounted to slide. In said mass of elastomer is included a body, whose volume, in a certain range of temperatures, increases as the temperature drops. In a preferred embodiment of the invention, this body is advantageously water contained in at least one sealed and deformable bag.

2 Claims, 1 Drawing Figure

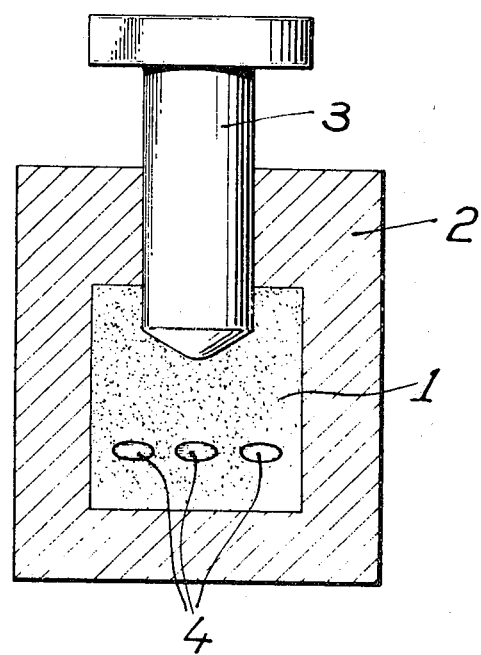

SPRING FORMED OF AN ELASTOMER MASS INCLUDING WATER

The present invention relates to improvements in springs or energy absorbers of the type in which an elastomer is subjected to hydrostatic compression.

Generally, such apparatus are designed to absorb considerable energies communicated to a piston sliding in an enclosure, engaging in the mass of elastomer contained in this enclosure and compressing it. However, these springs have been found to be imperfect in operation, this depending on the ambiant conditions of use, particularly on variations in temperature.

To obviate these drawbacks, the invention proposes a very simple means.

To this end, the invention has for its object an improved spring of the type in which an elastomer is subjected to hydrostatic compression, constituted by a mass of elastomer contained in an enclosure which comprises a casing in which a piston is mounted to slide. In said mass of elastomer is included a body, whose volume, in a certain range of temperatures, increases as the temperature drops. In a preferred embodiment of the invention, this body is advantageously water contained in at least one sealed and deformable bag.

The invention will be more readily understood on reading the following description with reference to the accompanying drawings, in which:

The single FIGURE is a schematic section through an improved spring according to the invention.

To understand the invention more easily, it is necessary to recall some experimental discoveries concerning heretofore known springs. In fact, when the ambient conditions of use change, particularly when the temperature decreases, there is no homogeneity of contraction for the complete spring. Assuming that the casing is made of steel, its contraction will be inferior in volume to that of the elastomer. In the enclosure determined by the casing, there will therefore be a volume freed by the elastomer more contracted than the casing. It is therefore understood that the expected spring effect, by compression of the elastomer under the effect of a load applied to the piston, occurs only after the space made free by the contraction of the elastomer has been filled, hence a modification in the characteristics of the spring.

As seen in the FIGURE, an elastomer 1 is contained in an enclosure formed by a casing 2 and a piston 3 sliding in this casing. Bags of water 4 are inserted within the elastomer 1. Thus, when there is a drop in temperature, particularly below 4° C, the water increases in volume and freezes according to a well known principle. The proportion of water to be included in the elastomer, for the increase in volume that it undergoes to suitably compensate the relative contraction of the elastomer 1 with respect to the casing 2 will have been calculated in advance.

The use of water for obtaining such a result is very advantageous since, in addition to its negligible cost price, it reacts, under normal conditions of use, in the same way as the elastomer which surrounds it having substantially the same characteristics as far as compression is concerned.

Advantageously, its packing in sealed and deformable bags enables it to be handled simply and placed precisely in position, avoiding contact with the walls of the casing in order not to risk breaking the bags by possible friction and the leakage of this water along said walls and the piston.

The present invention finds an advantageous application in devices for coupling railway vehicles subjected to multiple ambient conditions of use.

What we claim is:

1. An improved spring of the type in which an elastomer is subjected to hydrostatic compression wherein an elastomer mass is contained in an enclosure defined by a metallic casing and by a piston mounted to a slide in a wall of the casing, the improvement characterized in that the elastomer mass comprises inclusions of water contained in at least one sealed and deformable bag.

2. The spring of claim 1 wherein the inclusions of water are present in a proportion to compensate for the relative contraction between the elastomer and metallic casing at low temperature.

* * * * *